Patented Dec. 19, 1950

2,535,020

UNITED STATES PATENT OFFICE 2,535,020

PLASTICIZED AMINO-ALDEHYDE RESINS

John T. Stephan, Seattle, Wash., assignor to Monsanto Chemical Company, St. Louis, Mo., a corporation of Delaware No Drawing. Application February 4, 1949, Serial No. 74,719

6 Claims. (Cl. 260—29.4)

This invention relates to the use of terpineol or equivalent pine oil as a plasticizer to prevent excessive brittleness and cracking in hardened products made from amino-aldehyde resin solutions.

In the present description and claims, the term "amino-aldehyde resins" is used in its narrow sense to embrace the common urea- and melamine-formaldehyde resins in accordance with the usual trade classification.

When used as adhesives or for casting shaped articles in a mold, these resins are made up in the form of aqueous syrups which harden to resinous bodies under the influence of heat or acid catalysts or both after the adhesive has been applied or the casting poured into the mold. In either case, if the mass is of appreciable thickness, as in a casting or in a heavy spread of adhesive, as the constituent water is dissipated, progressive brittleness develops, often causing the adhesive or casting to shatter spontaneously into numerous fragments.

In the case of similar solutions in organic solvents, such for instance as urea or melamine baking enamels, the problem has not been troublesome because these organic solutions are readily plasticized with a variety of available organic plasticizers.

Attempts have been made to plasticize the aqueous dispersions of these resins with various water-soluble plasticizers such as glycerine and other polyhydric alcohols. The results thus obtained have not been entirely satisfactory because the plasticizing effect of these materials is not permanent or at least is not of sufficient duration.

It has now been discovered that terpineol, either in the pure form or in the form of its commercial solution as pine oil, provides a very satisfactory, permanent and economical plasticizer for urea or melamine resins.

Example

A 60% solids content aqueous solution of a urea-formaldehyde resin in the form of a viscous spreadable syrup was incorporated with 15% of pine oil together with an acid catalyst effective to cause the solution to harden in about 4 hours. A portion of the syrup was poured into a mold and allowed to stand and harden. Another portion of the syrup was used as a plywood adhesive and the assemblies were clamped together. After the adhesive had hardened, the casting was removed from the mold and the plywood was removed from the clamps. After the elapse of one year, it was found that the cast block was tough and entirely free from cracks and the plywood glue bond was also intact and had retained its original strength without showing brittleness on flexing.

Similar samples made up without the addition of pine oil showed undesirable brittleness in the plywood bond and the casting had spontaneously cracked into small fragments.

It was found that pure terpineol and pine oil can be used interchangeably for this purpose but, since pine oil appears to be almost equally effective weight for weight, it is the preferred material because of its lower cost.

The proportions of pine oil required to produce the plasticizing effect may be varied over wide limits, in some instances as little as 1% being satisfactory and under severe conditions the addition of 15% to 25% being required. For plywood adhesives, the ordinary requirement is from 2% to 10% based on the dry resin solids content.

A water-soluble amino-aldehyde resin powder may also be admixed with a small amount of pine oil with or without a latent acidifying catalyst in dry form and the powder sold as an adhesive for admixture with water to spreading consistency. The desired plasticizing effect is then obtained in the final hardened resin.

Equally satisfactory results were obtained with melamine-formaldehyde resins as well as from mixed resins.

I claim:

1. A plasticized water-soluble amino-aldehyde resin comprising 1% to 25% by weight, based on said resin, of terpineol as the plasticizer.

2. A plasticized hardened resinous composition comprising a water-soluble amino-aldehyde resin and 1% to 25% by weight, based on said resin, of terpineol.

3. A water-soluble powder comprising a water-soluble amino-aldehyde resin and 1% to 25% by weight, based on said resin, of terpineol.

4. The method of plasticizing a water-soluble amino-aldehyde resin which comprises the step of incorporating 1% to 25% of terpineol in an aqueous solution of the resin and causing the resin to harden.

5. A plasticized resinous composition comprising a water-soluble amino-aldehyde resin and 1% to 25% of terpineol.

6. An adhesive in the form of a spreadable aqueous syrup comprising an amino-aldehyde resin solution and 1% to 25% by weight, based on said resin, of terpineol.

JOHN T. STEPHAN.

REFERENCES CITED

The following references are of record in the file of this patent:

UNITED STATES PATENTS

| Number | Name | Date |
|---|---|---|
| 2,208,290 | Glycofrides | July 16, 1940 |
| 2,312,210 | Dearing | Feb. 23, 1943 |
| 2,317,371 | Gessler | Apr. 27, 1943 |
| 2,342,642 | Cassel | Feb. 29, 1944 |

OTHER REFERENCES

Mattiello's Protective and Decorative Coatings, 1941 edition, vol. 1, p. 566, John Wiley and Sons, New York.